United States Patent [19]

Lord

[11] Patent Number: 5,198,806

[45] Date of Patent: Mar. 30, 1993

[54] REMOTE CONTROL AND SECURE ACCESS FOR PERSONAL COMPUTERS

[75] Inventor: John J. Lord, Springfield, Ill.

[73] Assignee: Lord & Sebastian, Inc., Springfield, Ill.

[21] Appl. No.: 636,135

[22] Filed: Dec. 31, 1990

[51] Int. Cl.$^5$ .............................................. H04B 1/00
[52] U.S. Cl. .................................. 340/825.31; 379/102
[58] Field of Search ........... 340/825.3, 825.31, 825.34; 379/93, 95, 102, 105

[56] References Cited

U.S. PATENT DOCUMENTS 4,206,444 6/1980 Ferlan .................................. 379/102

Primary Examiner—Donald J. Yusko
Assistant Examiner—Dervis Magistre
Attorney, Agent, or Firm—Patula & Associates

[57] ABSTRACT

A computer activation device comprised of at least one local computer system and at least one remote computer system, the computer systems are connected via a standard data communication interface by their own modems. An activator device is in electrical communication with the data communication interfaces of the local and remote computer systems, such that the activator device controls the application of operative power to the local computer system on receipt and recognition of a secure coded signal from the data communication interface of the remote computer system.

19 Claims, 3 Drawing Sheets

REMOTE CONTROL AND SECURE ACCESS FOR PERSONAL COMPUTERS

This invention relates to a remote control for computer systems and particularly to an apparatus for the activation and secure access of a remotely located computer system.

BACKGROUND OF THE INVENTION

There is a need for a reliable and secure means for activating and accessing a remote computer or computer system. One area in which the need is currently acute is in the transfer of data between a lap top or a portable computer and a remote data base computer system which is primarily stationary. There are two problems. Either the portable computer is unable to contain all the data it needs to access for some applications; or it is not practical to keep a remote data base computer system active continuously and vulnerable to unauthorized access.

It is therefore important to have an apparatus for activating or de-activating a remote computer via a serial link such as a conventional telephone modem link. Upon detection of a recognizable and compatible transmission through a modem, the present invention activates a power switching device supplying power to the local computer rendering it operative from a remote location. Once operable, the invention software is loaded up and executed automatically to prevent any further access or use until the correct code is transmitted. Upon any interruption or termination of the transmission the local computer is secured and deactivated. No known device accomplishes these innovative tasks.

In the past, devices for starting up a computer remotely via telephone line has been utilized. For example, U.S. Pat. No. 4,701,946 to Oliva et al: discloses a logic means between a modem and a computer, which monitors the modem output and then can activate the computer. U.S. Pat. No. 4,723,269 to Summerlin, disclosed a circuit for starting up an unattended computer via phone line or by preprogramming by means of a ring detector and an optically coupled triac. In each of these disclosures, no mention of security coding is made.

In U.S. Pat. No. 4,647,721 to Busam et al: a telephone activated power controller detects a telephone ringing signal or off-hook condition on an incoming telephone line and powers up the stationary unattended computer which is connected both directly and via a modem. In the above references, no provisions have been made for secure access to the system.

Other inventions have afforded some security means, but differ vastly in other means. In U.S. Pat. No. 3,984,637 to Caudill et al; the system disclosed connects a computer to a transmission path only when a predetermined code is received. Two individual codes are needed for operation. The drawback to this device is that the power supply to the unattended stationary computer is not controlled requiring the computer to be on constantly and the resultant equipment failures and breakdown caused thereby.

Other coding security devices are known, but without the same function as the present invention. U.S. Pat. No. 4,006,316 to Bolgiano; discloses a telephone remote control system with coding by the use of touch tone transmitted digits without the use of a modem. U.S. Pat. No. 4,733,345 to Anderson; discloses a computer telephone security device which compares passwords from a master unit and a remote terminals slave unit.

A known device which powers up computer equipment remotely via a standard communication lines to transmit control and identification signals is U.S. Pat. No. 4,206,444 to Ferlan. However, such a device discloses and utilizes complicated and less flexible circuitry in comparison to the simple and more flexible design of the present invention. Ferlan does not allow for changing access codes remotely because, codes are burn-in on a PROM. Furthermore, the invention is limited to a set number of characters for an access code unable to provide greater security. Ferlan in relation to the present invention has a number of hardware limitations instead of software.

No known device provides a low cost simple solution to allow a remote terminal to activate or deactivate an unattended computer system and provide secure access to its files and programs.

Currently, a means for providing secure access is only available on large computer systems with an operating system that is designed to provide this function, and is not generally available for the common and more prolific so called personal computer. Additionally there is not a means to keep power removed from a computer system until such time that remote access is required.

As a result, it is a principal object of the present invention to provide an apparatus for activating or de-activating a remotely located computer via a serial communication link such as but not limited to a standard telephone/modem link.

It is another object to provide an inexpensive means to allow secure access to a remotely located computer such as, but not limited to a personal computer.

It is yet another object to control and reduce the time unused remote computer equipment is left powered up and not used thereby increasing the systems life, reduce electrical consumption and protect the system from power surges.

It is still yet another object to be readily adaptable to conventional modem control and telecommunication programs currently in use.

It is still yet another object to have many remote computers to be able to securely access the home or local computer.

Numerous other advantages and features of the invention will become readily apparent from the detailed description of the preferred embodiment of the invention, from the claims, and from the accompanying drawings, in which like numerals are employed to designate like parts throughout the same.

BRIEF SUMMARY OF THE INVENTION

The present invention is an apparatus for activating or deactivating a remotely located computer via a serial communication link such as but not limited to a telephone/modem link. A means to allow secure access to a remotely located computer via serial communication link. The invention consists of a remote terminal or computer with a conventional modem which is in electrical communication to telephone lines or a private network access which will carry signals to a local interface point to be in electrical communication with second conventional modem which is in electrical communication with the present invention in order to receive both control and data communication. The present invention and the external modem are supplied with operating power continuously. The local computer's power is connected to the switched power source of the present invention. A communication link connects the invention to the local computer which passes both control and data exchange via this link. The power to the local computer is controlled by the present invention. The control software which makes the invention operative and controls the local computer, can reside on a floppy disc, hard disc or any other non-volatile program storage medium that is used to provide boot-up instructions to the local computer. The logic software, establishes, upon power up via request from the remote terminal, through the telephone lines to the external modem and then the present invention, if access to the local computer should be granted upon the transmission of the proper coded password from the remote terminal or modem.

DESCRIPTION OF THE PREFERRED EMBODIMENT

Figure 1:
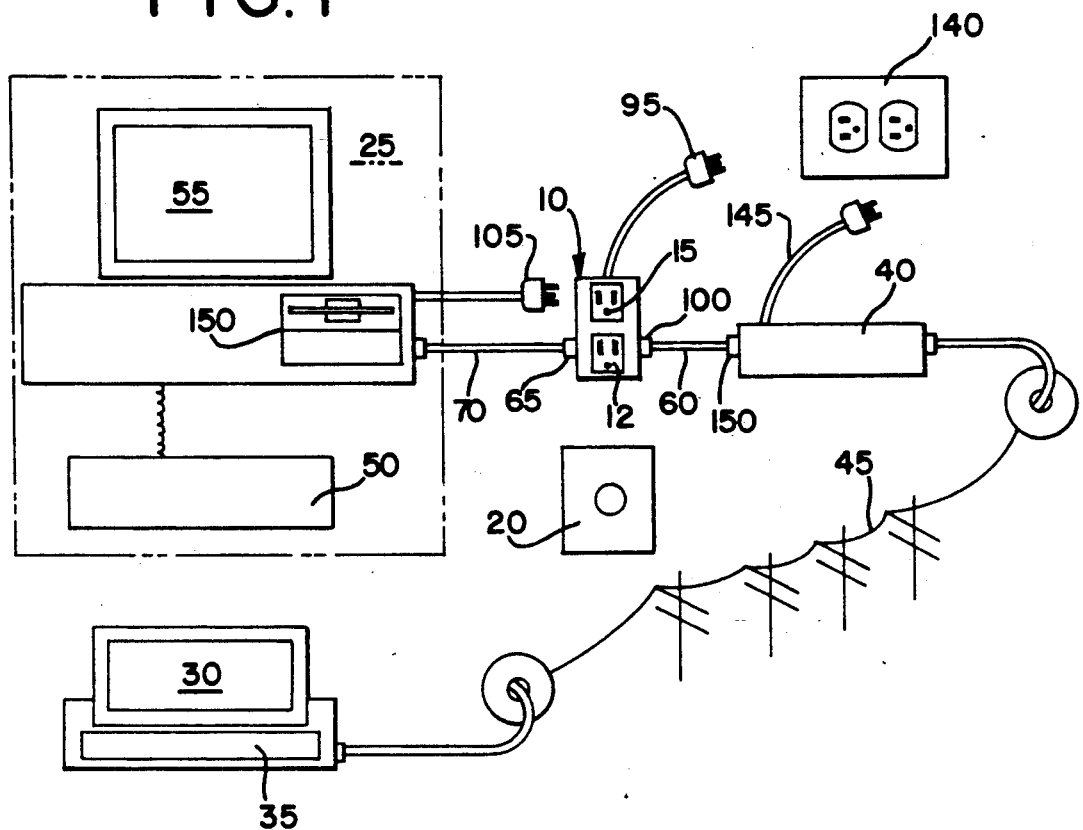
FIG. 1 depicts a schematic diagram of the present invention and its interconnection to a remote and local systems.

While the invention is susceptible of embodiment in many different forms, there is shown in the drawings and will be described herein in detail, a preferred and alternative embodiment of the invention. It should be understood, however, that the present disclosure is to be considered an exemplification of the principles of the invention and is not intended to limit the spirit and scope of the invention and/or claims of the embodiment illustrated.

As depicted in FIG. 1, the present invention 10 comprising of a remote controlled power switched outlet 15, unswitched outlet 12 and security access software 20 which allows the local computer 25 to be accessed by a remote terminal or computer 30 and modem 35 without operator intervention when the local computer 25 is not currently activated. The invention 10 also de-activates the local computer 25 when access has terminated or has been denied. Access is only granted to a remote computer 30 and modem 35 that has transmitted the proper coded password. The password resides in software which is contained on disk 20 and is recognizable and authenticated when disk 20 is read on local computer 25 in a conventional manner in response to communication from an input entered into remote computer 30. It is understood that the password may also reside in other memory mediums and reside in or to be read by remote computer 30. The invention 10 is utilized in conjunction with an external modem 40 and requires no modification of either the local computer 25 or modem 40 hardware.

With the local computer 25 having power removed by the power switched outlet 15, and modem 40 being powered up by power cord 145 and outlet 140 and monitoring the status of an interconnect means or public or private access network 45, the invention 10 awaits a signal via connector 150, cable 60 and connector 100 from the modem 40 signaling that a call has been answered and the caller has been identified as being a remote terminal or computer 35 requiring access to the local computer 25. Outlet 12 is unswitched and provides power for other computer equipment or even modem 40. At this point, the invention 10, through power switched outlet 15, provides power to the local computer 25 which automatically accesses the security access software 20 which resides on a conventional floppy disk medium which is by read by disk drive 150 in local computer 25 that prevents any access to the local computer 25 until the proper coded password has been received from the remote terminal or computer 30 and modem 35.

Upon receipt of the correct coded password a communication link is established via remote modem 35, interconnect means 45, modem 40, interconnect cable 60, the invention 10 and cable 70, between the remote terminal or computer 30 and the local computer 25.

Upon receipt of the correct coded password the interconnect means 45 or communication link between the remote terminal or computer 30 and modem 35, and the local computer 25 is established. The remote terminal or computer 30 and modem 35, virtually become the local computer's 25 keyboard or console device 50 thereby allowing full access to the local computer's 25 resources as if the remote operator were sitting in front of the local computer's 25 keyboard 50 and display screen 55. When access is no longer required or the carrier is lost, the local computer 25 is deactivated thereby conserving energy and extending its useful life.

Figure 6:
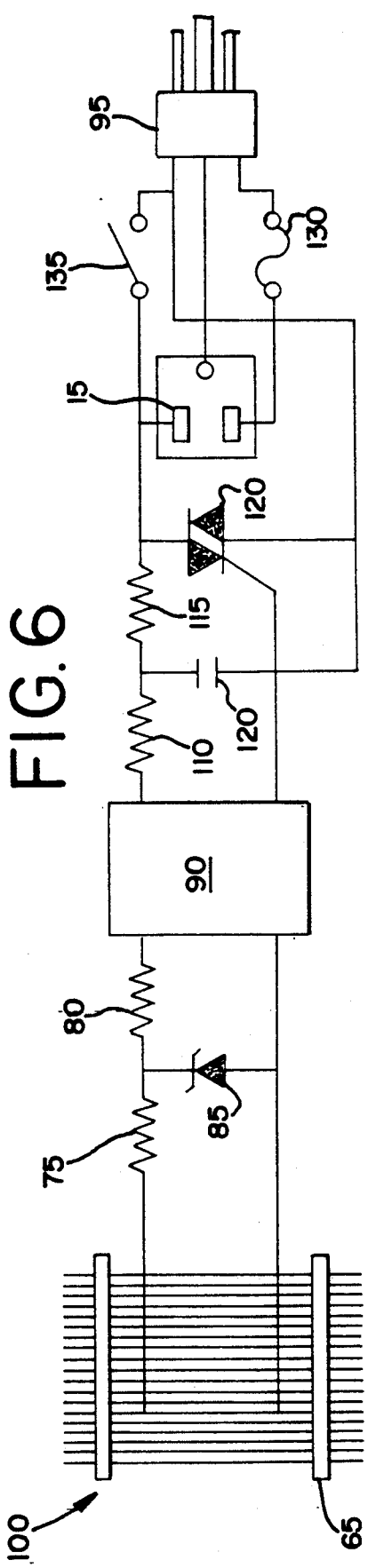
FIG. 6 depicts the preferred embodiment of the electronic circuitry of the present invention.

Depicted in FIGS. 1 and 6 is a suggested schematic of the electronic circuitry involved in the preferred embodiment of the invention. Modem 40 is powered by power cord 145 and outlet 140. Connector 150 on modem 40 interconnects all of the signals carried by the interface cable 60 to connector 100 on invention 10. Connector 65 on invention 10 interconnects all of the signals brought in on connector 100 and forms a connection with interface cable 70 which in turn connects to the serial communication port of local computer 25.

A current limiting resistor 75 (typical value of 220 ohms) is used in conjunction with zener diode 85 (typical device 1N4732) to form a controlled voltage source fed by a portion of the current being used to signal that the carrier of the remote terminal or computer 30 and modem 35 has been detected and is present, establishing the first precursor to accessing the local computer 25.

A current limiting resistor 80 (typical value of 100 ohms) is used to pass a controlled current to the opto-triac 90 (typical device MCP3011 or equivalent is commonly available from Motorola, Inc. of Schaumburg, Ill.) activating and de-activating it in concert with the carrier detect signal from modem 40.

The optically activated triac 90 provides electrical isolation between low voltage signals used within the computer 25 and modem 30, so that the operator is prevented from coming in direct contact with the 110 Volt alternating current utility power supplied by power cord 95 being used to power the invention 10 and indirectly the local computer 25 by power cord 105. This is done to provide protection from possible electrical shock and to meet safety requirements and regulations.

A resistor 110 (typical value 220 ohms) in conjunction with resistor 115 (typical value 2.2K ohms) and filter capacitor 120 (typical value 0.1 uf) form a filtered current source used to control power triac 120 (typical device T810DJ which is commonly available from Tag Semiconductors Ltd., (A Raytheon Company) Hohlstrasse 608/610, CH-8048 Zurich, via the optically activated triac 90 which in turn is being activated or deactivated by the carrier detect signal being generated by the modem 40. Power triac 120 in turn switches power to local computer 25 via switch receptacle 15.

The values of the discrete components identified in the operative description above have been selected by the following criteria. Resistor values 75, 80 and zener diode 85 as depicted in FIG. 6, are selected to protect the opto-triac 90 from being damaged by higher than anticipated voltages being placed across connectors 65 or 100. They are further selected to protect the opto-triac 90 from negative voltage intentionally generated by the typical line driver circuitry which is commonly used in the output of a modem 50. Furthermore, they are selected to guarantee operation in worst case scenario conditions and to provide sufficient signal level to a typical line receiver found commonly in the serial port of a computer 25.

The maximum forward current opto-triac 90 in the case of the MCP3011 can tolerate is 60 milliamps. A zener diode 85 in the case of a IN4732 at the common node of resistors 75 and 80, limits the voltage to 4.7 volts. Therefore the maximum current to the opto-triac 90 is calculated as: (Zener reverse voltage—Opto-triac forward voltage)/Resistor 80 resistance. Inserting typical values: (4.7−1.2)/100=35 milliamps. The maximum reverse voltage the opto-triac 90 can tolerate is 3.0 volts. Zener diode 85 limits this voltage to its forward drop of 0.7 volts. Resistor 75 assists in limiting the power dissipated in zener diode 85 while decreasing loading insuring that a line receiver will continue to operate reliably.

The minimum current that the opto-triac 90 requires is 5 milliamps. Therefore given a worst case scenario, if a line driver is powered with a +/−5.0 volt supply it can only supply 4.7 volts to the output and would typically have a source impedance of no more than 370 ohms. With resistor 75 and 80 being values 220 and 100 ohms respectively, the minimum current will be: (line driver output voltage—opto-triac forward voltage drop)/(line driver source impedance—resistor 75 -resistor 80). Inserting in the typical values: (4.7-1.2)/(370+220+100)=5.07 milliamperes. Even in this worst case scenario the resultant voltage is sufficient to meet a line receivers input requirements. It is understood that different combinations of component values will likewise perform commensurately per the criteria and calculations suggested above.

A fuse 130 (typical value of 5 amps) provides over current protection to the invention 10 and local computer 25.

A bypass switch 135 (typically a single pole, single throw type or the equivalent) allows power to be applied to the local computer 25 directly, overriding the control imposed by the presence or absence of the carrier detect signal, allowing local operation of computer 25.

Secure access of local computer 25 is achieved by the joint use of conventional software techniques and software commercially available, such as, but not limited to, Micro-Soft's (Microsoft Corporation, 16011 NE 36th Way, Redmond, Wash.) MS-DOS AUTOEXEC.BAT handling facility and the invention's security access software 20. Shown in the table below are the invention's security access software commands that are placed in the AUTOEXEC.BAT file and a description of their functions. One of ordinary skill in the art would understand these common functions in common commercially available software such as this. Micro-Soft's MS-DOS AUTOEXEC.BAT handling facility allows the computer 25 to execute a predetermined set of user defined commands located in the AUTOEXEC.BAT file located on computer 25 floppy disk drive 150 automatically upon power up. The invention's 10 security access software 20 inserts several commands into this AUTOEXEC.BAT file to do the following:

| COMMAND | DESCRIPTION OF FUNCTION |
| --- | --- |
| echo off | Suppresses any output from local computer 25 including the echoing back of inputted information. |
| mode com1:1200,n,8,2 | Sets up a compatible serial interface protocol with the external modem 40 via cable 70, connector 65, invention 10, connection 100, cable 60 and connector 150. |
| psw 1 PASSWORD | Invention's secure access software 20 that inputs an ASCII string terminated by a carriage return from the remote computer or terminal 30 and modem 35 via aforementioned communication link, compares it to the PASSWORD string placed in this command, and continues to repeat this process and in doing so suspends any further usefulness of local computer 25 until a password match is made. |
| ctty com1: | Re-directs local computer 25 console functions, keyboard 50 and display 55 to the remote computer or terminal 30 and modem 35 via aforementioned communication link. |

The result is that upon power up of local computer 25 by the invention 10 as a result of the action of remote computer or terminal 30 and modem 35 seeking access to local computer 25, secure access of local computer 25 is awarded upon recognition of a password being any set of ASCII characters that the software is pre-programmed to recognize, thereby granting entry to the full functionality of the local computer 25's operating system, data, programs or in general use if accessing user at remote computer 30 was in the presence of local computer 25.

Passwords in the software once accessible may be changed as desired by the user at either the local computer 25 or remote computer 30.

Figure 3:
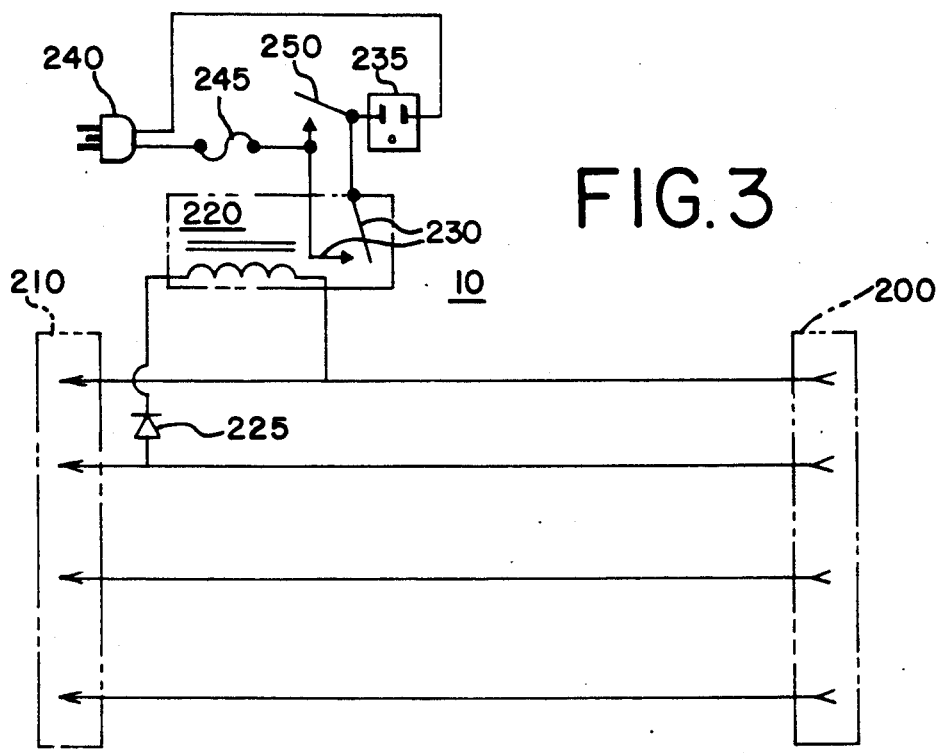
FIG. 3 shows the schematic diagram of the electronic circuitry involved in an alternative embodiment of the invention.

Depicted in FIGS. 1 and 3 is a electronic circuitry schematic of an alternative embodiment of the invention 10. Its operation is simply and effectively described as follows. The connector 100 on invention 10, acts as an interconnect between the modem 4 and the serial port of the local computer 25 via connector 65. All signals from the modem 40 and computer 25 are passed via this connection which to the electronical communication transmitted so that the invention 10 appears to be electronically transparent. One particular signal, namely the carrier detect from modem 40 which is sensed by a conventional sensitive electromechanical relay 220 (typical device Stancor Part No. MS64-931 manufactured by Hamilton Standard Controls, 131 Godfrey, St. Logansport, Ind.) via rectifying diode 225 (typically a 1N914 or equivalent) which is carried by interconnecting cable 60 and generated by modem 40 in response to a signal carried via the interconnect means 45 which is placed thereupon from remote computer or terminal 30 by local modem 35 when computer or terminal 30 requires access to remote computer 25. Diode 225 is used to isolate the proper sense of the carrier detect signal which conforms to any standard data communications interface in use and commonly available.

A standard data communication interface specifies various electrical and mechanical characteristics for communication interfaces between computers, terminals, and modems, including an interface consisting of 25 pins or leads, each of which provides a function, such as timing, control, or the sending of data. The present invention is not intended to be limited to this standard interface solely and it is envisioned that other standards will likewise be applicable. The preferred embodiment may use a well known specification known as Electronic Industries Association's RS232-C specification which provides a positive voltage relative to ground indicating carrier present and negative voltage relative to ground indicating not present. The carrier detect signal is generated by the modem 40 when the carrier from a remote modem 35 is detected and found to be compatible for the communication exchange required. The sensitive electromechanical relay 220 in turn applies power via relay contacts 230 to the local computer 25 via power receptacle 15. Power plug 95 is connected to the source of uninterruptable power while fuse 245 offers over current protection to the invention 10 and local computer 25. A bypass switch 135 (typically single pole-single throw or equivalent) imposed by the presence or absence of the carrier detect signal, allowing local operation of computer 25.

Figure 2:
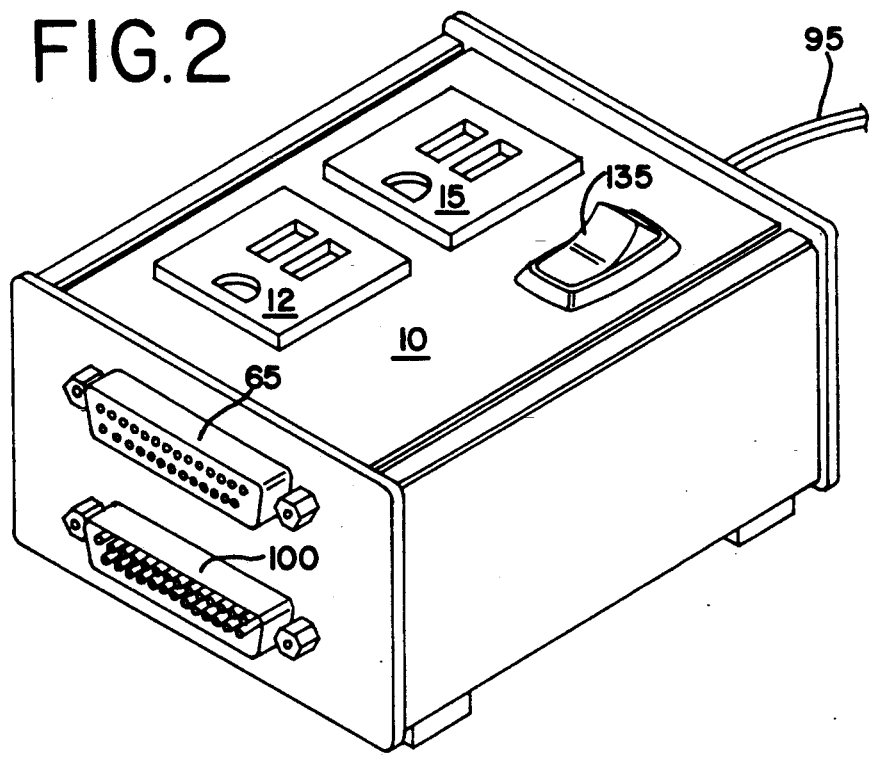
FIG. 2 depicts a typical housing configuration of one of the embodiments of the present invention.

FIG. 2 depicts another method of housing the present invention. The components identified are the same as those shown in the preferred embodiment.

Figure 4:
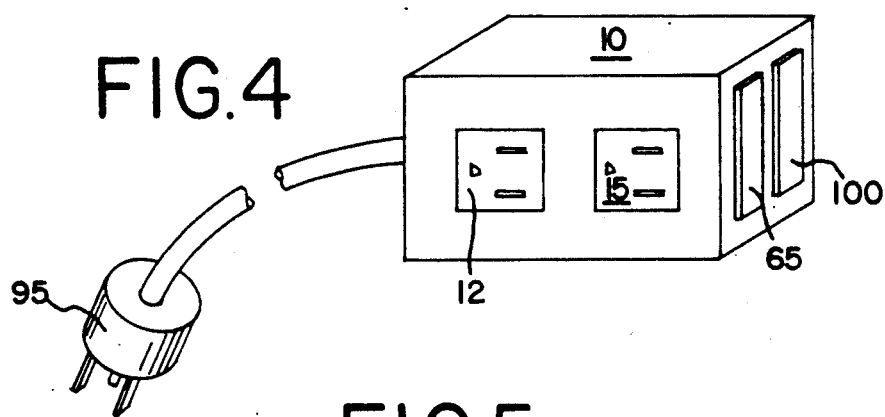
FIG. 4 depicts a typical housing configuration of the present invention.

FIG. 4 depicts one method of packaging the circuitry where by all the communication lines are passed through the power switching enclosure. The component features numbers are for the same as shown in the preferred embodiments.

Figure 5:
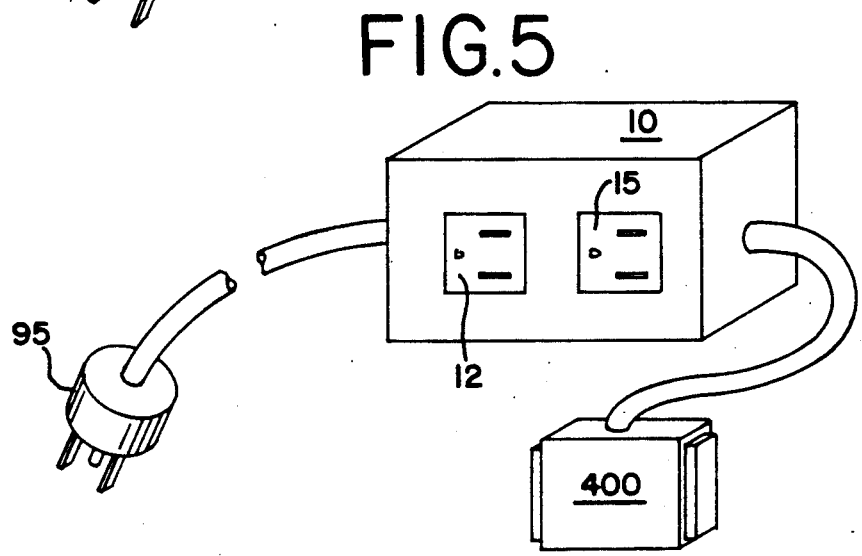
FIG. 5 depicts an alternative housing configuration of the present invention.

FIG. 5 depicts another method of packaging the circuity where by only the necessary communication signals are tapped off a cable adapter 400 which is of RS232-C or equivalent near the modem or the computer's serial port then carried back to the power switching enclosure.

Depicted in FIG. 6 is the schematic of the electronic circuitry involved in the preferred embodiment of the invention.

The foregoing specification describes only the preferred embodiment of the invention as shown. Other embodiments besides the ones shown, described and claimed may be articulated as well. The terms and expressions therefore serve only to describe the invention by example only and not to limit the invention. It is expected that others will perceive differences which while differing from the foregoing, do not depart from the spirit and scope of the invention herein described and claimed.

What is claimed is:

1. A secure activator device for use in activating computer equipment remotely, comprising:
a first computer system having an interconnect means for communicating with other computers remotely, said first computer system having a first modem in electrical communication with said interconnect means;
at least one second computer system having an interconnect means for communicating with other computers remotely, said at least one second computer system having a second modem in electrical communication with said interconnect means; and
activator means for providing power to said first computer system, said activator means in electrical communication between said first modem and said second modem by said interconnect means, such that when at least one said second computer system requests data communication with said first computer system by communicating a password to said activator means, which upon recognition thereof said activator means provides power to said first computer system and thereupon authentication of the password by computer software stored in said first computer system, said activator means provides electrical communication access to said first computer system.

2. The secure activator device of claim 1, wherein said activator means is comprised of circuitry having a power activating triac which is conditioned by a carrier signal generated by said second modem.

3. The secure activator device of claim 1, wherein said activator means is comprised of circuitry having a power activating triac which first is conditioned by a carrier detect signal generated by said first modem.

4. The secure activator device of claim 3 wherein said activator means is further comprised of an optically isolated triac.

5. A secure activator device for use in activating computer equipment remotely, comprising:
a first computer system having an interconnect means for communicating with other computers remotely, said first computer system having a first modem in electrical communication with said interconnect means;
at least one second computer system having an interconnect means for communicating with other computers remotely, said at least one second computer system having a second modem in electrical communication with said interconnect means; and
activator means for providing power to said first computer system, said activator means in electrical communication between said first modem and said second modem by said interconnect means, such that when at least one said second computer system requests data communication with said first computer system by communicating a password to said activator means, which upon recognition and authentication of the password by computer software stored in said first computer system, said activator means provides electrical communication access to said first computer system.

6. The secure activator device of claim 5 wherein said activator means is comprised of circuitry having a power activating triac which is conditioned by a carrier signal generated by said second modem.

7. The secure activator device of claim 5 wherein said activator means is comprised of circuitry having a power activating triac which first is conditioned by a carrier detect signal generated by said first modem.

8. The secure activator device of claim 6 wherein said activator means is further comprised of an optically isolated triac.

9. The secure activator device of claim 7 wherein said activator means is further comprised of an optically isolated triac.

10. A secure computer activation device for use in activating a local computer system by a remote computer system comprising:

interconnect interface means for electronically communicating data between the local computer system and the remote computer system; and activator means for controlling the power to the local computer system, said activator means in electrical communication with said interconnect interface means between the local computer system and the remote computer system, said activator means supplies power to the local computer system and further electrical communication access via recognition of a password electrically communicated from the remote computer system through said interconnect interface means to the local computer system, wherein said password is recognized and authenticated by computer software stored in the local computer system.

11. The secure computer activation device of claim 10 wherein said interconnect interface means is further comprised of at least two modem.

12. The secure computer activation device of claim 10, wherein said activator means is comprised of circuitry having a power activating triac which is conditioned by a carrier detect signal generated by said interconnect interface means.

13. The secure computer activation device of claim 11 wherein said activator means is comprised of circuitry having a power activating triac which is conditioned by a carrier detect signal generated by said at least two modems.

14. The secure computer activation device of claim 13 wherein said power activating triac is an optically isolated triac.

15. The secure computer activation device of claim 10 wherein said password is a set of electronic signals recognized by said software stored in the local computer system.

16. A computer activation device for use in securely activating a local computer system with modem by a signal communicated utilizing standard interconnect lines from a remote computer system with modem, comprising:

activator means for controlling the power to the local computer system, said activator means in data communication with the modems of the remote and local computer systems; said activator means provides the power to the local computer system upon receipt and recognition by the local computer system of a required password from the remote computer system via the standard interconnect lines.

17. The computer activation device of claim 16 wherein said activator means is comprised of circuitry having a power activating triac which is conditioned by a carrier signal generated by the modem of remote computer system.

18. The computer activation device of claim 17 wherein said power activated triac is an optical activated triac.

19. The computer activation device of claim 16 wherein said activator means comprises a relay to apply operative power to the local computer system.

* * * * *